June 19, 1962　　　W. L. IKARD　　　3,040,321
SEISMIC RECORDING SYSTEM
Filed May 20, 1958　　　2 Sheets-Sheet 1

Wallace Luther Ikard　　Inventor

By John D. Gassett　　Attorney

June 19, 1962   W. L. IKARD   3,040,321
SEISMIC RECORDING SYSTEM
Filed May 20, 1958   2 Sheets-Sheet 2

Wallace Luther Ikard   Inventor

By John D. Dassett   Attorney 3,040,321
SEISMIC RECORDING SYSTEM
Wallace L. Ikard, Tulsa, Okla., assignor to Jersey Production Research Company, a corporation of Delaware
Filed May 20, 1958, Ser. No. 736,615
7 Claims. (Cl. 346—1)

This invention broadly concerns an improved seismic method and apparatus for use in geophysical prospecting. More particularly, the invention relates to an apparatus and method for recording seismic signals of the type that are generated by seismic detectors or transducers in response to reception of seismic waves. The invention especially concerns an improvement in the system of recording seismic signals in the form of reproducible traces.

The application of geophysical techniques in prospecting for subterranean deposits of mineral, gas, and petroleum is well known. Of particular interest and value is the reflection method of seismic prospecting which uses seismic impulses that are initiated in the vicinity of the surface of the earth. In essence, each such impulse generates an electric wave of seismic frequency which is transmitted down through the earth. As the wave encounters discontinuities in the earth's structure such as strata of varying density, at least a portion of the energy in the wave is reflected and is turned toward the surface of the earth. One or more seismic detectors positioned at the surface of the earth generate electrical signals in response to the reception of the returning wave energy. By arranging a plurality of geophones or other seismic transducers at spaced distances from the seismic disturbance points, it is possible to detect the arrival of the reflected seismic waves at the surface of the earth. Furthermore by using accurate timing devices and recording means it is possible to determine not only the magnitude of the signals received of the various geophones, but also to measure the time required for the seismic waves to travel from the disturbance point down to the various discontinuities and thence to the geophones. It is well known to those in the art that it is possible to calculate and determine the depths of the various discontinuities beneath the surface of the earth.

Generally speaking, the "seismic signal" generated by each detector or group of detectors in a seismic observation is recorded in the form of a separate trace on a seismogram. In other words, each trace on a seismogram is a record with time of the variations in the output of the detector associated with the trace.

Originally seismogram traces were usually oscillographic type traces formed by the action of a recording pen or a beam of light on suitable recording paper or photographic film. More recently however it has become an increasing practice to record seismic detector signals in the form of reproducible traces such as variable density or variable area photographic traces, magnetic traces, and the like.

Reproducible traces have become especially desirable, since equipment and methods are now available for automatically reproducing, correcting, and re-recording such traces in the form of seismic sections. Indeed seismograms containing reproducible trace information possess so many desirable features that it has been found advantageous to convert visual, non-reproducible, oscillographic type trace seismic records into the reproducible type.

Since a magnetic recording of a seismic signal is obtained in effect by varying the magnetization of the recording medium along its length, it will be recognized that variations in the relative velocity between the recording medium and the recording head may have a serious effect upon the fidelity of the information recorded. This is true whether the seismic signal is an "original signal" recorded directly from the seismic detector, or whether it is a "reproduced signal" obtained by "playing back" and re-recording previously recorded information. Generally speaking, the problem is not a very serious one in recording "original signals" or in recording "reproduced signals" obtained by playing back reproducible seismograms, since equipment and methods for processing such signals may be made substantially constant in speed. The problem, however, can be quite severe in re-recording seismic signals that are obtained by translating visible, non-reproducible oscillographic trace seismograms into reproducible seismograms. Oscillographic traces are sinusoidal in appearance and they frequently overlap one another with the result that methods and apparatus for "reproducing" such traces cannot conveniently be made to be constant in their rate of scan along the traces. Thus it generally takes much more time and care to scan along an involved portion of an oscillographic trace than it does along a relatively simple portion of a trace. It is frequently advantageous to take more time with complex portions of such traces since these portions are frequently the portions of real interest in the trace. At this point it should be noted that apparatus and methods have been developed for reproducing otherwise non-reproducible oscillographic type traces into a variable density form.

Accordingly, it is a general object of this invention to provide a system of recording a seismic signal in reproducible form wherein the adverse effects caused by variations in the speed or velocity of the recording medium in relation to the recording unit are reduced. It is a more specific object of the invention to provide an improved method and apparatus for translating a visible oscillographic type seismic trace into a reproducible recording upon a magnetic recording medium. It is a particular object of the invention to provide a system for transcribing conventional "wiggly trace" or oscillographic trace records to pulse width modulated magnetic tape records wherein adverse effects of varying the rate of scanning along the length of the trace are eliminated.

These and related objects of the invention will be expressly discussed or readily apparent in the following description. At this point it will be recalled that a magnetic record of a seismic signal is conventionally made by effecting relative movement between a recording head and a magnetic recording medium and by modulating a carrier signal used to activate the recording head in response to variations in a seismic signal. The present invention improves upon this system by recording a signal on the record consisting of a series of equally spaced "on" or "plus" pulses with "off" or negative pulses spaced between them in a manner depending only on a transcribed trace amplitude. In a preferred embodiment for transcribing visible oscillographic type seismic traces into a reproducible recording upon a magnetic recording medium, the system includes obtaining a signal to be recorded on the magnetizable medium from a bistable multivibrator. The bistable multivibrator preferably has two triodes characterized in that when one triode is conducting, the other triode is non-conductive; the triodes will be maintained in this stable condition until triggered or activated by an outside source at which time the triodes will reverse—that is, the triode that was conductive will become non-conductive and the triode that was non-conductive will be conductive. One of the triodes is activated or rendered conductive at equal intervals of movement between the recording head and the recording medium. The other triode is activated according to the amplitude of the trace being transcribed and in effect determines the length of time the first triode is conductive. This is accomplished preferably by gearing a variable speed motor drive such that one revolution of the motor produces motion between the recording medium and recording head of the amount to be occupied by one cycle of the carrier signal. The carrier signal is modulated by triggering means connected to the two sides or triodes of the bistable multivibrator which are preferably 180° apart relative to the motor shaft rotation. One of the triggering means remains fixed relative to the motor while the other rotates about the motor axis of the shaft to angular displacements from the other triggering means directly proportional to the displacement of the stylus following the amplitude of the trace being transcribed. In other words, one position of the motor is used to render one of the triodes in the multivibrator conductive while the amplitude of the trace is used to determine when the second triode is conductive and the first triode is rendered non-conductive.

The invention may be better understood by reference to the attached drawing which illustrates a preferred embodiment of the invention as well as the best mode contemplated for carrying out the invention.

Figure 1:
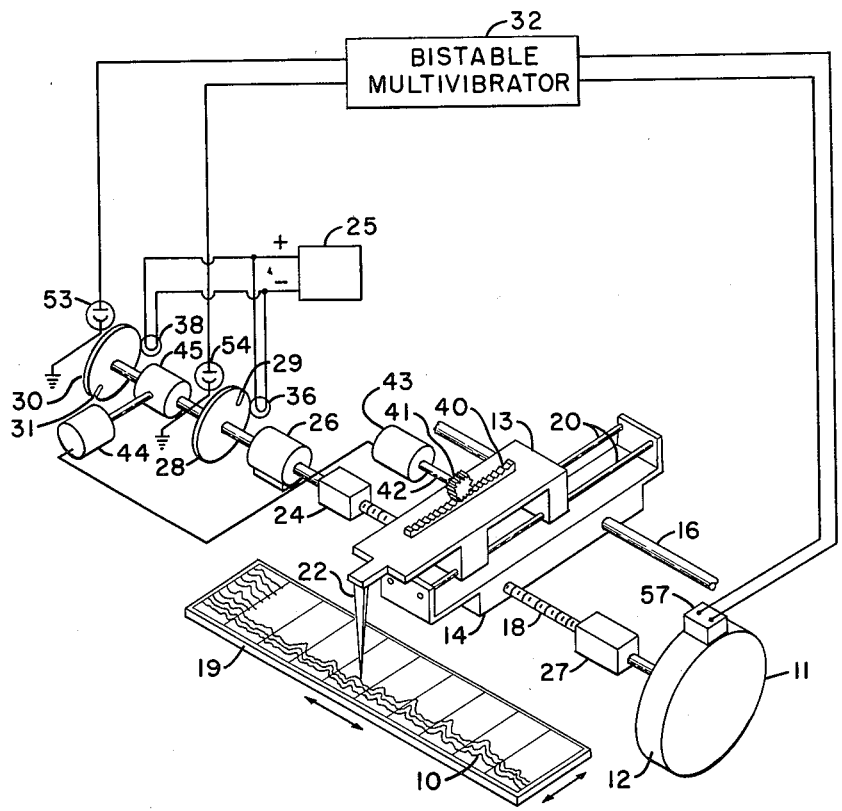
FIG. 1 is a schematic view of an apparatus embodying the principles of the invention which is adapted to translate or transcribe the oscillographic traces on a seismic record into a reproducible record upon a magnetic medium.

Turning first to FIG. 1 of the drawing, there are illustrated a seismic record 10 consisting of a plurality of oscillographic traces; a magnetic recording medium 12, lower carriage 14, longitudinal carriage bar 16, lead screw 18, transverse carriage bars 20, and stylus 22. Also illustrated are gear reducers 24 and 27, variable speed motor 26, notched disc or wheel 28, a second notched disc or wheel 30, photocell 53 which is associated with notched disc or wheel 30, and photocell 54 which is associated with notched disc 28, bistable multivibrator 32, recording head 57, and drum 11.

As indicated in FIG. 1, lower carriage 14 is mounted upon lead screw 18 and longitudinal carriage rod 16. Transverse carriage bars 20 are in turn supported by lower carriage 14 and they in turn support the upper carriage 13. Upper carriage 13 is slidable along the length of the upper carriage bars 20 and has stylus 22 at one end mounted above the seismogram 10. The magnetic recording medium 12 may be preferably mounted upon a recording drum 11. The drum is conveniently supported near the other assembly and is rotatable past the recording head 57. Drum 11 is preferably driven by motor 26 through shaft 18 and gear reducers 24 and 27. Gear reducers 24 and 27 may preferably be supported from a common base not shown. Gear reducer 27 is used to obtain the proper relationship between the movement of recording medium past head 57 and the movement of stylus 22 along seismogram 10.

It will be recognized that as stylus 22 is moved along the length of the seismogram 10, the magnetic recording medium 12 on drum 11 is similarly moved along beneath recording head 57. It should also be noted at this point that seismogram 10 is mounted on a suitable support 19 which is capable of longitudinal as well as transverse motion relative to the traces on the seismogram. It will be recognized that independent adjustment of the seismogram 10 by movement of its supports is desirable from the standpoint of properly aligning the traces to be transcribed. A detailed illustration of suitable supporting means for the seismogram has not been included in the figure in order to keep it as simple as possible. The nature of suitable supporting means however will be readily apparent to persons skilled in the art. It is therefore not considered necessary to include such information in this drawing.

While it is possible to provide means for enabling stylus 22 to automatically follow along a trace on seismogram 10, it will be assumed in the present description that stylus 22 is actuated in its lateral movements by manual means.

Longitudinal movement of stylus 22 along the length of the traces of the seismogram 10 is obtained by means of motor 26 which drives a lead screw 18 preferably through reduction gear unit 24. Lead screw 18 may be a self-reversing type resembling for example the self-reversing screws that are used in fishing reels. Then when lower carriage 14 reaches one end of the lead screw, it may reverse automatically and return to the opposite end of the screw. Limit switches may be provided at each end of the lead screw 18 or carriage rod 16 to more positively limit the movement of the carriage member 14 along the seismogram 10. The limit switches may also be reversing switches adapted to reverse the action of the motor 26 of the reduction gear 24 so as to automatically reverse the movement of the carriage 14 when it has reached one limiting position on the lead screw 18.

Drive motor 26 is preferably a variable speed motor operated for example by means of a foot treadle in the same manner as a sewing machine motor. As explained earlier, a variable speed drive is desirable in the apparatus of FIG. 1 since it enables an operator to scan complex portions of the seismogram 10 at slower speeds than he scans simple portions of the seismogram.

Also driven by motor 26 is disc 28 which has a slot 29 on its periphery. Disposed on opposite sides of the slot 29 are light source 36 and photoelectric cell 54. The disc, the light source, and the photoelectric cell are aligned so that light is transmitted to the photoelectric cell once during every revolution of the disc 28. The light source 36 may receive its power from any convenient source 25. Also driven by motor 26 is disc 30 which has slot 31 on its periphery. Disposed on opposite sides of the slot 31 are light source 38 and photoelectric cell 53. Disc 30, light source 38, and photoelectric cell 53 are aligned so that light is transmitted to the photoelectric cell 53 once during every revolution of the disc 30. Light source 38 may likewise receive its power from any convenient source 25.

At this point it will be recognized that photoelectric cell 54 receives a fixed number of pulses from the light sources 36 for every unit of linear measure along the seismogram 10 that the stylus travels. As the speed of the rotation of drum 11 is directly proportional to the longitudinal movement of the seismogram 10 with respect to stylus 22, it is thus seen that recording head 57 records on magnetic tape a series of pulses, the leading edges of the pulses being equally spaced. The actual number of pulses is determined by such factors as the pitch characteristics of the lead screw 18 as well as the rotational speed of the drum relative to the rotational speed of the disc 28. However, the number of pulses should preferably be sufficient to sample each cycle of the highest frequency component of the seismic signal at least about five times. As indicated in the figure, the output signal of photoelectric cell 54 is connected to one side of a bistable multivibrator 32. The output signal of photoelectric cell 53 is connected to the other side of bistable multivibrator 32.

A rack 40 is mounted on the upper carriage member 13 and a pinion gear 41 and its shaft 42 are supported so that lateral movement of upper carriage 13 causes the pinion to move relative to the rack. This movement in turn positions a transmitting selsyn 43 which is mounted on shaft 42 to be actuated by the rotation of shaft 42. In turn receiving selsyn 44 drives a differential unit 45. Differential unit 45 may be a conventional type which is capable of driving disc 30 in unison with disc 28. The receiving selsyn drives differential unit 45 so as to position slot 31 of disc 30 in relation to slot 29 of disc 28 in accordance with movement of rack 40. In other words, the position of slot 31 in relation to slot 29 is dependent upon the amplitude of the trace being transcribed.

Figure 3:
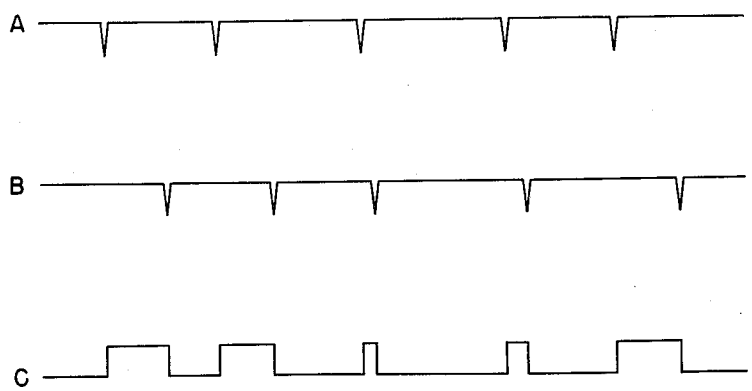
FIG. 3 illustrates curves which are typical of the signal generated by various components within the apparatus.

As previously pointed out, for every rotation of disc 28, light is transmitted from light source 36 through slot 29 to photoelectric cell 54. Likewise for every revolution of disc 30, a pulse of light from light source 38 will be transmitted through slot 31 to photoelectric cell 53. When stylus 22 is at the neutral or zero line of the trace being transcribed from seismogram 10, slot 31 is preferably set at 180° out of phase with respect to slot 29 of disc 28. Thereafter the angular position of slot 31 of disc 30 with respect to slot 29 of disc 28 is dependent upon the amplitude of the trace being transcribed. The signals from photoelectric cell 54, as indicated in curve A of FIG. 3, occur at regular intervals along the length or distance of the tape of magnetic recording medium 12 of drum 11. The curve representative of the signal from photoelectric cell 53 is illustrated as curve B of FIG. 3, and occurs once during the interval between the spikes of curve A. The signals from photoelectric cell 53 and 54 are fed to bistable multivibrator 32 which has an output signal illustrated at curve C of FIG. 3. It is thus seen that each rectangular pulse of curve C begins with each "spike" of the signal from photoelectric cell 54 and stays conducting or stays on until the "spike" of the signal from photoelectric cell 53 occurs. The signal from bistable multivibrator 32, represented by curve C, is then fed to recording head 57 where it is recorded upon the magnetic recording medium 12.

Figure 2:
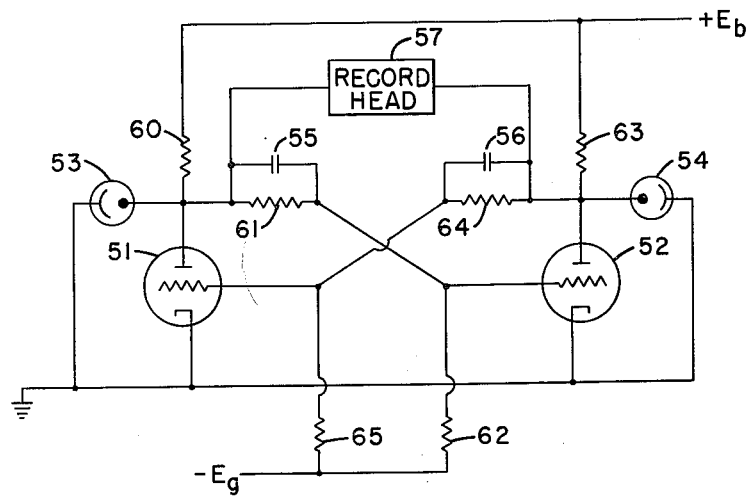
FIG. 2 is a schematic wiring diagram of a particular preferred type of modulator assembly for use in the apparatus of FIG. 1.

A better understanding of the operation of the bistable multivibrator circuit can be had by referring to FIG. 2. A preferred embodiment of the bistable multivibrator circuit comprises triodes 51 and 52 with the associated resistor and capacitor components. As the name implies, the multivibrator has two stable states with one state having triode 51 conductive and triode 52 non-conductive and the second stage being with triode 52 conductive and triode 51 non-conductive. Assuming that initially triode 52 is conducting, the voltage drop due to its current flowing through resistor 63 will reduce the voltage on the grid of triode 51 due to the voltage divider action of resistors 64 and 65 sufficiently to keep triode 51 in a non-conducting or cut-off position. With triode 51 in its cut-off position, the voltage divider action of resistors 60, 61, and 62 maintains the grid of tube 52 high enough to cause it to conduct. Similarly, when triode 51 is rendered conductive, it is likewise retained in a stable condition.

The circuit in FIG. 2 can be triggered back and forth between its two stable states by injecting a negative voltage at the plate of the cut-off or non-conducting triode. Thus, as illustrated in FIG. 2, the circuit is triggered back and forth between the two states by alternately supplying pulses of light to photoelectric tubes 53 and 54. Referring back to FIG. 1, these pulses of light are derived through slot 31 in disc 30 and slot 29 in disc 28, respectively.

To further explain the operation of the circuit in FIGURE 2, it may be assumed that the circuit is in a condition such that triode 52 is conducting and triode 51 non-conducting. If a pulsation of light now reaches photocell 53, then photocell 53 conducts momentarily and the current causes a voltage drop across resistor 60. This voltage drop is coupled through a capacitor 55 and voltage divider resistors 61 and 62 to the grid of triode 52. Triode 52 is thus cut off and its plate voltage rises and thereby raises the grid voltage of triode 51 through the capacitor 56 and the voltage divider resistors 64 and 65. This rise in turn augments the action of the photocell by lowering the voltage on the plate of triode 51 still further. This results in rendering triode 52 non-conductive and triode 51 conductive, or in other words, it switches the circuit from one stable configuration to the other. A light pulsation applied through phototube 54 will reverse the action, switching the circuit back to the original configuration.

The record head 57 is selected to be a low current high impedance device which will not disturb the action of an appropriately designed bistable multivibrator circuit. Alternate application of light pulsations of phototubes 53 and 54 then will cause a current on the record head to flow first in one direction and then in the other direction as the plate voltages of the triodes 51 and 52 alternate between high and low levels. The alternations of the direction of the flow of current through the record head 57 will be reflected as an alternation of the magnetization of the magnetic recording medium 12.

Referring now especially to FIG. 1, the apparatus shown therein may be operated substantially as follows. First a seismogram or a visual oscillographic trace is placed on support 19 and a magnetic recording medium such as magnetic tape is placed on drum 11. The supports are then adjusted so as to have the stylus 22 and recording head 57 properly aligned relative to the seismogram and to the magnetic recording medium, respectively. The stylus, for example, is centered over and at one end of a trace on a seismogram; and the recording head is similarly placed at a predetermined point on the magnetic recording medium.

Longitudinal movement of stylus 22 along seismogram 10 is realized by starting motor 26. This motor drives lead screw 18 through gear box 24 and the lead screw in turn drives the lower carriage 14. It will be noted that the lower carriage 14 is provided internally with threads which engage the threads of the lead screw so that rotation of the screw causes the carriage member to advance along the length of the screw. It will also be noted that clutches or the like may be inserted in the power train between motor 26 and the lead screw to facilitate the starting and stopping of stylus 22.

The stylus 22 is moved along the length of a trace of seismogram 10 by means of motor 26 at a rate controlled by the operator. The operator similarly controls lateral movements of the stylus to follow amplitude variations in the trace—in this case by a simple manual procedure. As stylus 22 moves longitudinally with respect to seismogram 10, the magnetic recording medium on drum 11 which is preferably magnetic tape is rotated under recording head 57 at a rate proportional to the longitudinal movement of stylus 22. When stylus 22 has negotiated the length of each trace, the direction of travel of the stylus is reversed and it is returned to the opposite end of the seismogram 10. At this point the support member 19 is moved as desired so as to enable the operator to transcribe another trace of a seismogram with the recording head 57 being moved laterally relative to the magnetic tape 12. The scanning operation is then repeated for this new trace and the entire sequence is repeated until all of the traces have been scanned.

As stylus 22 travels longitudinally along each trace on the seismogram 10, magnetic recording tape 12 similarly travels under recording head 57. Simultaneously with the movement of stylus 22, disc 28 rotates on its shaft and repeatedly exposes photocell 54 to light source 36. As a result, a series of pulses of electrical energy is transmitted to the plate of triode 52 of the bistable multivibrator 32. The current then flows through recording head 57 in one direction until photoelectric cell 53 receives a pulsation of light from light source 38 through slot 31 in disc 30 at which time triode 51 is rendered conductive and triode 52 is rendered non-conductive, thus reversing the direction of the current through record head 57. It is thus seen that triode 52 is rendered conductive a predetermined number of times during each unit length of the seismogram. Pulses, then, occur at fixed spacing intervals along the magnetic recording medium. With a magnetic recording medium scale of 7.5 inches per second of time indicated on the original seismogram, the pulses should occur in the range of 50 to 250 times for each inch of the length of the recording medium for normal seismic frequencies with a preferred occurrence being about 100 per inch. The preferred pulse occurrence will vary with variations in the scale of the original seismogram; however, the number of pulses will preferably result in at least five pulses per cycle of the highest frequency recorded. The length of travel time during which triode 52 conducts is dependent upon the relative position of slot 31 of disc 30 in relation to slot 29 of disc 28. It is preferred that when stylus 22 is in a neutral line or zero base line with respect to the trace which it is scanning, that slot 31 be 180° out of phase with slot 29. It is thus seen that when the stylus is on the neutral line, triode 52 remains conductive for one-half of the time. However, as stylus 22 follows the trace, the duration of the time which triode 52 is conductive is proportional to the amplitude of the trace. It is thus seen that a pulse-width modulated record is made on a magnetic tape in which pulse width is proportional to the amplitude of the signal and is independent of the rate at which the visual trace is scanned.

It is also seen that this invention is especially suited for transcribing conventional wiggly-trace seismic records to pulse-width modulated magnetic tape records in which the signal recorded on a magnetic recording medium is generated by a bistable multivibrator or the like. Each side of the bistable multivibrator is triggered independently with one side being triggered at equal intervals along the length of the magnetic recording medium. The occurrence of the triggering of the other side in relation to the first side is modulated according to the amplitude of the trace being transcribed. Both triggering means are independent of the speed of the recording or scanning.

In summary, then, this invention relates to a system for recording a seismic signal as a pulse-width modulated signal on a recording medium in which the leading edges of the pulses occur an equal number of times for each unit length of the recording medium and are equally spaced along such medium. The position of the trailing edge of each pulse with respect to its leading edge is a function of the instantaneous amplitude of the seismic signal.

It will be noted that the foregoing description is being concerned with merely one preferred structural embodiment of the invention. It will be apparent that numerous modifications may be incorporated within the apparatus without departing from the spirit or scope of the invention.

The invention claimed is:

1. A method for transcribing conventional oscillographic-type seismic records to pulse-width modulated recording magnetic medium records which comprises scanning the length of said trace, said scanning having longitudinal movement and lateral movement, such lateral movement following amplitude variations of the oscillographic-type seismic records being scanned at a speed variable during such scanning, effecting relative movement between the magnetic recording medium and a magnetic recording head with such relative movement being proportional to the speed of the longitudinal component of said scanning, activating said recording head with an equal number of pulses of a predetermined magnitude for each equal interval of relative movement, and varying the width of said pulses along said magnetic medium in accordance to the lateral movement of said scanning.

2. An apparatus for transcribing conventional "wiggly-trace" seismic records to pulse-width modulated recording magnetic medium records which comprises a magnetizable medium, a magnetic recording head, mounting means for said "wiggly-trace" seismic record, scanning means capable of lateral and longitudinal movement with respect to said mounting means, means to effect relative movement between said magnetic recording head and said medium with said movement being proportional to the longitudinal movement between said scanning means and said mounting means, a bistable multivibrator having two triodes and being characterized in that when one triode is conductive, the other triode is non-conductive and being further characterized in that when one of said triodes is conductive, the output signal from said multivibrator is in a reverse direction from the output signal when said other triode is conducting, means for rendering one of said triodes conductive an equal number of times for each unit of longitudinal movement between said scanning means and said mounting means, means for varying the duration of each period of conductivity of the one triode according to the amplitude of said wiggly trace being scanned, and means for conducting the signal from said multivibrator to said recording head.

3. An apparatus for transcribing conventional "wiggly trace" seismic records into pulse width modulated recording magnetic medium records which comprises mounting means for holding said "wiggly-trace" seismic records; a magnetizable medium; a magnetic recording head; scanning means capable of lateral and longitudinal movement with respect to said mounting means; means to effect relative movement between said magnetic recording head and said medium with said movement being proportional to the longitudinal movement between said scanning means and said mounting means; means to trigger a pulse an equal number of times for each unit interval of relative movement between said head and said medium; means to modulate the width of said pulse according to the amplitude of the lateral movement of said scanning means; and means for conducting the modulated signal to said recording head.

4. An apparatus for transcribing a conventional "wiggly-trace" seismic record to a pulse width modulated recording magnetic medium record which comprises: a magnetizable medium, a magnetic recording head, mounting means for said "wiggly-trace" seismic record, scanning means capable of lateral and longitudinal movement with respect to said mounting means, means to effect relative movement between said magnetic recording head and said medium with said movement being proportional to the longitudinal movement between said scanning means and said mounting means; a first light source, a second light source, a first photo-electric transducer, a second photo-electric transducer, a first rotatable disc containing a slot and positioned between said first light source and said first photo-electric transducer; a second rotatable disc having a slot therein spaced between said second photo-electric transducer and said second light source; and means to rotate said first and said second disc proportional to the longitudinal movement of said scanning means; control means to control the relative annular position of the slot in said first disc and the slot in said second disc according to the lateral movement of said scanning means; a circuit means having a first output pulse of one polarity beginning at the time when the slot in said first disc is aligned between said first photo-electric cell and said first light source, the duration of such pulse ending upon the slot of said second disc becoming aligned between said second light source and said second photo-electric cell; and means for conducting the signal from said circuit means to said recording head.

5. An apparatus for transcribing conventional "wiggly-trace" seismic records to a pulse width modulated recording medium which comprises: mounting means for said "wiggly-trace" seismic record; scanning means capable of lateral and longitudinal movement with respect to said mounting means such that said scanning means is operable to follow said "wiggly-trace" seismic record; a recording medium; a magnetic recording head means; means to effect relative movement between said recording head means and said medium with said movement being proportional to the longitudinal movement between said scanning means and said mounting means; a light source; a photo-electric transducer spaced from said light source and arranged to receive light therefrom; interruption means to intermittently interrupt the light from said light source to said photo-electric transducer, said interruption means being such that said photo-electric transducer is rendered conductive an equal number of times per each unit of longitudinal movement between said scanning means and said mounting means; a circuit means responsive to said photo-electric transducer to have an output signal of a first polarity; control means responsive to the lateral position of said scanning means to control the duration of the output signal of said circuit means; and means for conducting the signal from said circuit means to said recording head.

6. A method for transcribing conventional oscillographic type seismic records to a pulse width modulated recording medium which comprises: scanning the length of said trace at a variable speed, said scanning having longitudinal movement and lateral movement such that the oscillographic type trace can be closely followed; effecting relative movement between the magnetic recording medium and the magnetic recording head, such relative movement being proportional to the longitudinal component of the speed of said scanning; activating said recording head at regular intervals of relative movement between said head and said medium; modulating the width of each said pulse along said magnetic medium in accordance with the lateral component of movement of said scanning; and conducting said pulses to said recording head.

7. A method as defined in claim 6 in which the number of pulses is sufficient to sample each cycle of the highest frequency component of the seismic signal at least five times.

References Cited in the file of this patent
UNITED STATES PATENTS

| | | |
|---|---|---|
| 2,415,879 | Hassler | Feb. 18, 1947 |
| 2,712,694 | Herbold | July 12, 1955 |
| 2,791,288 | Meier | May 7, 1957 |
| 2,801,407 | Lubkin | July 30, 1957 |
| 2,877,080 | Eisler et al. | Mar. 10, 1959 |
| 2,887,674 | Greene | May 19, 1959 |
| 2,900,215 | Schoen | Aug. 18, 1959 |
| 2,924,653 | Fairchild | Feb. 9, 1960 |